No. 748,931. PATENTED JAN. 5, 1904.
G. F. CONNER.
VALVE GEAR FOR ENGINES.
APPLICATION FILED MAY 4, 1903.
NO MODEL. 7 SHEETS—SHEET 1.

Witnesses.
Inventor.
George F. Conner
by
Clement R. Stickney,
Attorney.

No. 748,931. PATENTED JAN. 5, 1904.
G. F. CONNER.
VALVE GEAR FOR ENGINES.
APPLICATION FILED MAY 4, 1903.
NO MODEL. 7 SHEETS—SHEET 2.

FIG. 2.

Witnesses.
C. Th. de Kam
W. H. Bodrell

Inventor.
George F. Conner.

by:
Clement R. Stickney.
Attorney

No. 748,931. PATENTED JAN. 5, 1904.
G. F. CONNER.
VALVE GEAR FOR ENGINES.
APPLICATION FILED MAY 4, 1903.
NO MODEL. 7 SHEETS—SHEET 5.

No. 748,931. Patented January 5, 1904.

UNITED STATES PATENT OFFICE.

GEORGE F. CONNER, OF PORT HURON, MICHIGAN.

VALVE-GEAR FOR ENGINES.

SPECIFICATION forming part of Letters Patent No. 748,931, dated January 5, 1904.

Application filed May 4, 1903. Serial No. 155,542. (No model.)

*To all whom it may concern:*

Be it known that I, GEORGE F. CONNER, a citizen of the United States of America, and a resident of the city of Port Huron, county of St. Clair, and State of Michigan, have invented certain new and useful Improvements in Valve-Gear for Engines, of which the following is a full, clear, and exact specification.

This invention relates to valve-gear for engines, and especially to valves of the puppet type, in conjunction with operative mechanism by which a cut-off may be obtained at any desired instant of the piston-stroke.

One object of the invention is to afford direct passages for the steam whereby the piston may act under practically boiler-pressure and at the same time so balance the valve as to reduce the pressure on the running parts and minimize the wear thereon.

Another object of the invention is to provide a reversing-gear having comparatively few parts and so constructed as to be inclosed and shielded from dust and dirt.

A further object of the invention is to afford complete control of the valve-gear when running, so that the cut-off point may be raised to suit the engine-load independently of the governing device.

Figure 1:
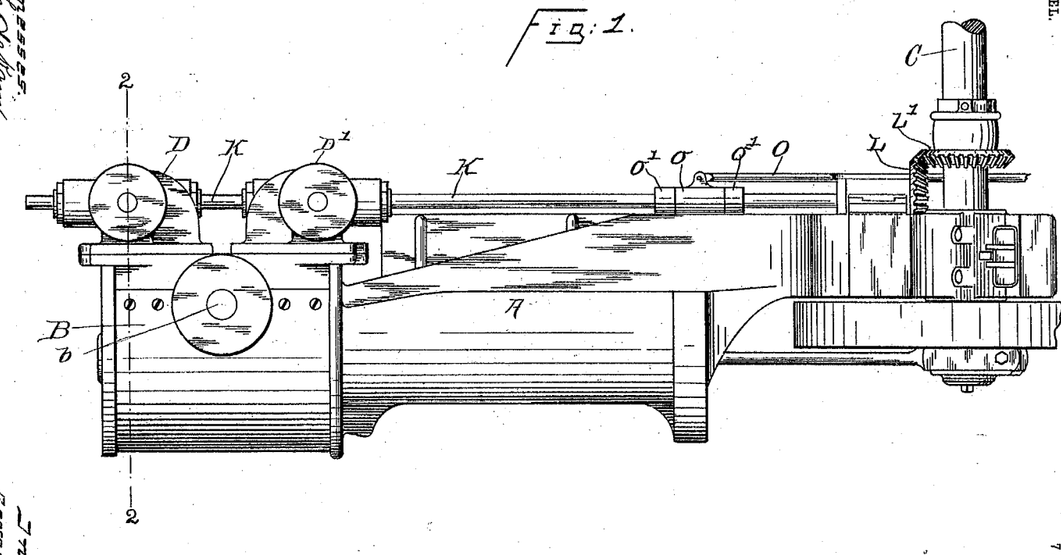
Figure 1 is a plan view of an engine, cylinder, and drive-shaft provided with a valve-gear which embodies the principal features of the invention.
Figure 2:
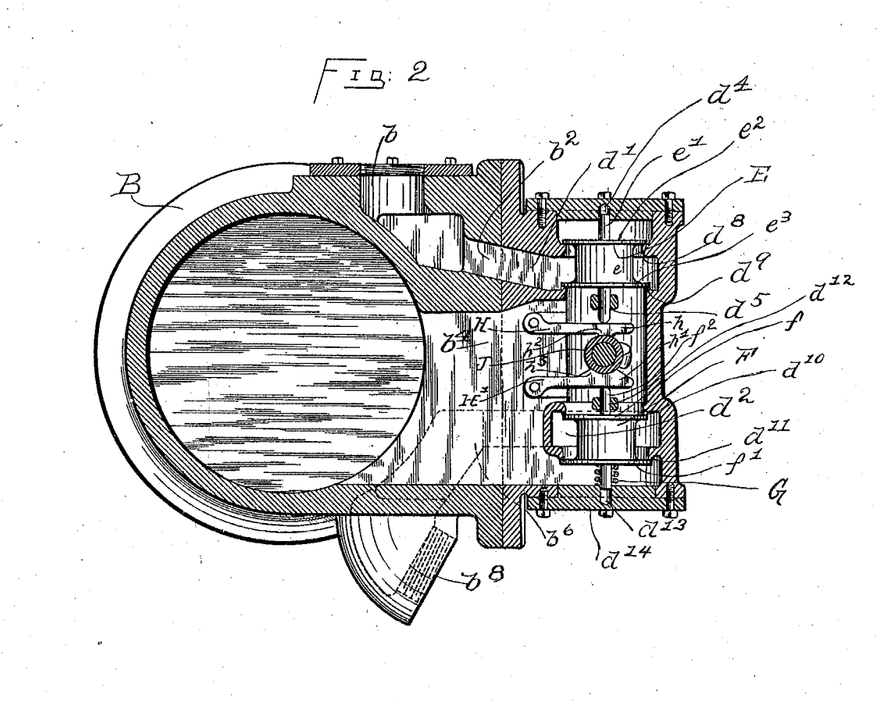
Fig. 2 is a view in cross-section through a valve-casing, taken on line 2 2 of Fig. 1 and slightly enlarged.
Figures 3, 5:
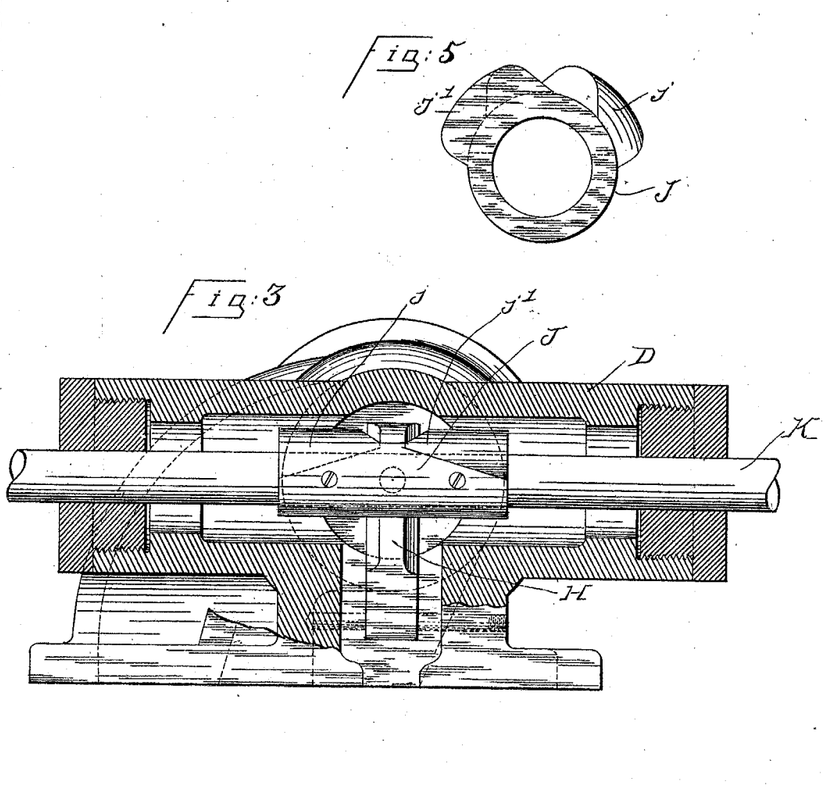
Fig. 3 is a view in cross-section through the valve-casing, taken at right angles to the view in Fig. 2.
Fig. 5 is a view in detail of a cam-collar.
Figure 4:
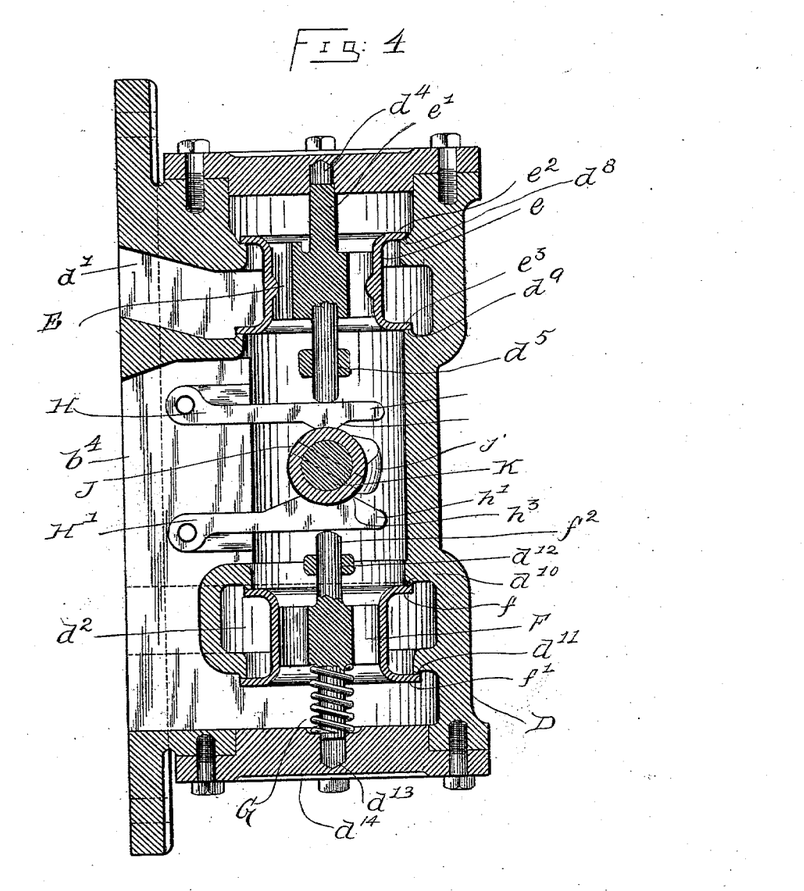
Fig. 4 is a view in longitudinal section through the valve-casing.
Figure 6:
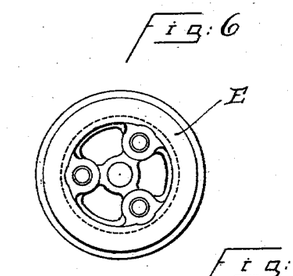
Fig. 6 is a view in end elevation of a steam-valve.
Figure 7:
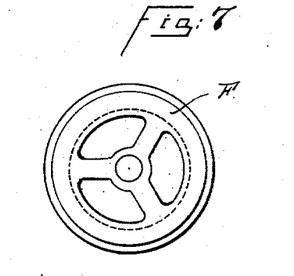
Fig. 7 is a view in end elevation of an exhaust-valve.
Figure 8:
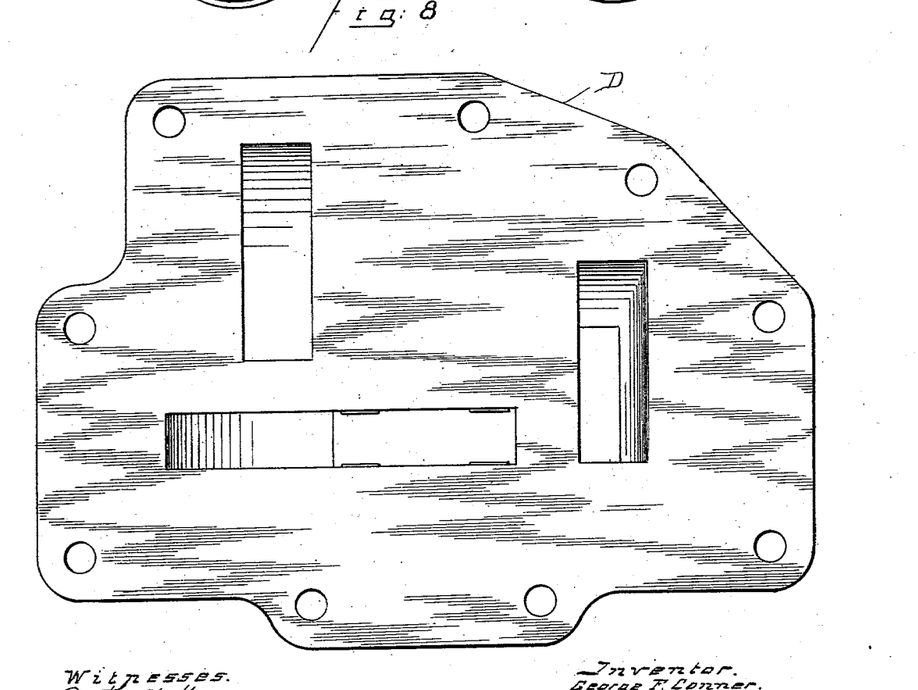
Fig. 8 is a plan view of a valve-casing.
Figure 9:
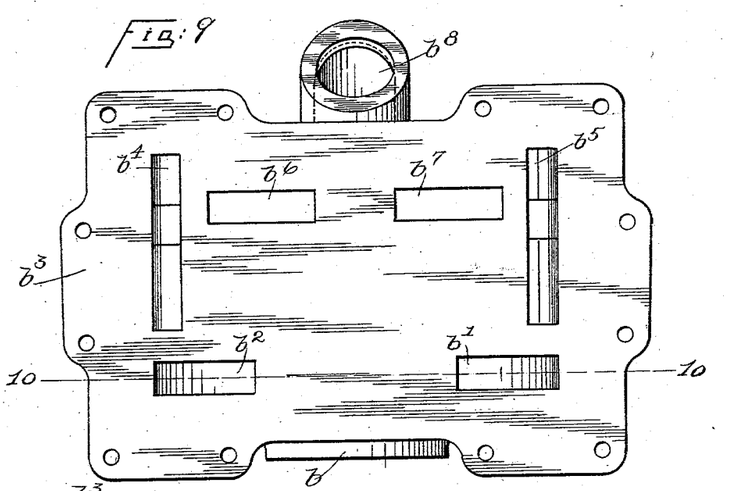
Fig. 9 is a view of a cylinder-casing arranged and adapted to receive the valve-casings.
Figure 10:
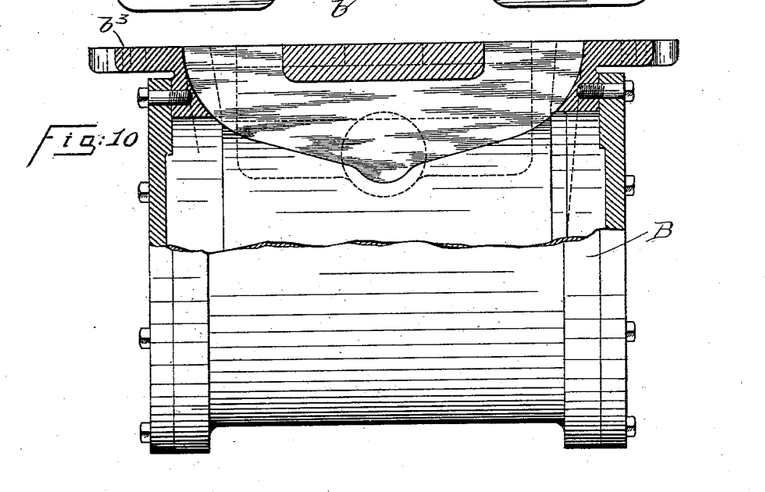
Fig. 10 is a view in longitudinal section on line 10 10 of Fig. 9.
Figure 11:
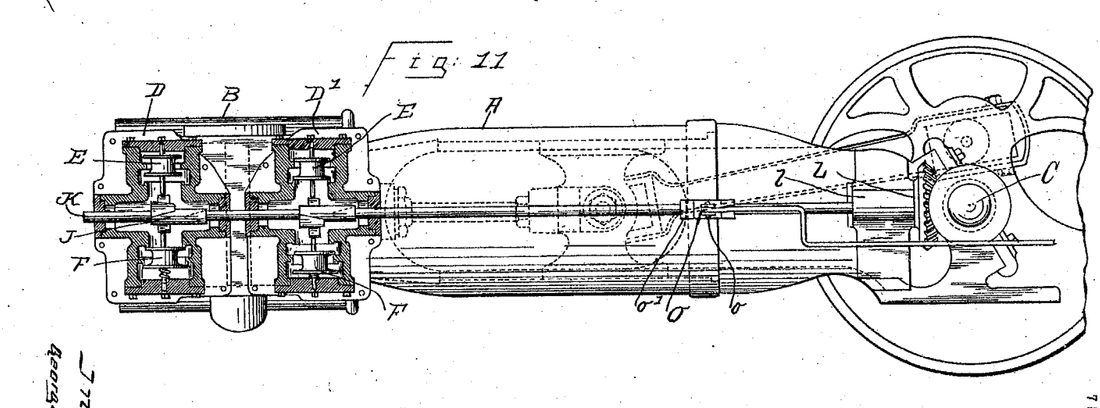
Fig. 11 is a view in side elevation of an engine-cylinder, crank-shaft, and crank, together with a view in section through the valve-casings, showing the parts in operative relation.
Figure 12:
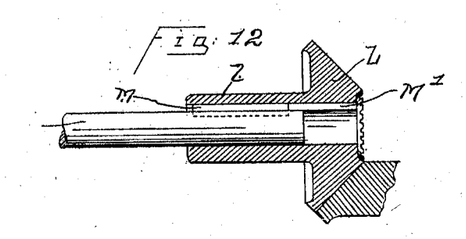
Fig. 12 is a view in detail of the connection of a cam-shaft and its driving-pinion.

Referring to the drawings, A represents an engine-frame with a cylinder B and main shaft C. Said engine may be of any preferred design and is not *per se* a subject of this application. Said cylinder B is provided with a steam-supply duct $b$, fitted in the usual manner for connection with a steam-generator. Said duct is forked, its two branches leading to symmetrically-disposed supply-ports $b'$ $b^2$ in a bed-plate $b^3$, formed integrally with the cylinder and adapted to receive the distributing-valve casings. Steam-ports $b^4$ $b^5$ open into either end of the cylinder, and exhaust-ports $b^6$ $b^7$ in the plates $b^3$ lead therefrom to a common exhaust $b^8$.

While the details of the construction of the valve-gear may obviously be varied to suit the engine on which it is employed, the form herein disclosed is at the time of this application preferred, because adaptable for use on a wide range of engine types. In its essential features it is constructed as follows: Oppositely-disposed steam-chests or distributing-valve casings D D' are suitably secured at either end of the cylinder B, each comprising a suitable valve-casing D, through which a steam-passage $d'$ is formed, so as to bridge or connect the supply-port $b^2$ of the cylinder B with the steam-port $b^4$ and the supply-port $b'$ with the steam-port $b^5$. An exhaust-passage $d^2$ is likewise formed in each of the casings, so as to bridge or connect the steam-port $b^4$ with the exhaust-port $b^6$ and the steam-port $b^5$ with the exhaust-port $b^7$. Each of said passages in each casing leads through two annular valve-seats. Said sets of valve-seats are preferably in axial alinement, although this is not an essential feature of the construction.

Referring now to one casing—as, for instance, the outboard-casing—the valve-seats $d^2$ and $d^3$ in the steam-passage $d'$ are provided with a valve E. Said valve comprises a cylindrical shell $e$, which is centered on the seats by an axial stem $e'$, whose projecting ends are reciprocable in guide-apertures $d^4$ and $d^5$ of the valve-casing $d$. Said shell $e$ is provided at either end with radial flanges $e^2$ and $e^3$, which are appropriately faced to form steam-tight joints when the valve is home. When said shell $e$ is seated, it is therefore a complete seal to the passage of steam from the supply-port $b^2$ to the steam-port $b^4$ through the casing. As a further detail of construction the inner annular seat $d^3$ has a larger diameter than the outer valve-seat $d^2$, and as a consequence the valve is held to its seat not only by the back pressure in the cylinder, which acts inwardly against the outer flange $e^2$, but is also retained by the direct boiler-pressure against the flange $e^3$.

A second valve F, similar in detail of construction to the valve E, is seated upon the exhaust-valve seats $d^{10}$ and $d^{11}$, which are oppositely disposed to the seats $d^2$ $d^3$. Said valve F is provided with an inner flange $f$ of less diameter than an outer flange $f'$ to correspond to the different diameters of the valve-seats $d^{10}$ $d^{11}$, which are thus formed to allow easy withdrawal of the valve for inspection and repair. Said valve F has an axial stem $f^2$, sliding in guide-apertures $d^6$ $d^7$ of the valve-casing, and is held to its seat normally by a spring member G, which encircles the stem $f^2$ and acts in compression between the valve F and the steam-chest head $d^8$. The latter is removably secured to the shell to allow access to the valve-casing. Said valve F when seated cuts off the escape of the steam from the steam-port $b^4$ through the exhaust-port $b^6$. It is evident from this construction that the alternate raising of the valves in the casing D from their respective seats will alternately admit and release steam from the outboard end of the cylinder. In order to effect this movement, lifting-levers H H' are pivotally secured in the valve-casing, their inner free ends $h$ $h'$ contacting with the proximate ends of the valve-stems $e'$ $f^2$. The side of each lever opposite to the stems is provided with a projection, as $h^2$ $h^3$. Said projections are fastened to form cams, and when the engine is at rest said cams bear against and ride on the collar J. In order to allow the exhaust-valve to be kept open a longer interval of time than the steam-valve, the cam-face of the exhaust-lever is provided with a larger bearing-face than the cam-face of the valve-lever. Said collar J is provided with oppositely-disposed cams $j$ and $j'$, which may be formed integrally with the collar. A preferable construction is to fashion them of detachably-secured lugs, so that worn ones may be readily replaced. The cams are separated by an interval of sufficient width to allow the lifting-levers to ride on the collar when the latter is so positioned as to bring the lever ends between the cams, and this position corresponds to the center position of the slide-valve link-motion.

In order that the levers may be brought readily into engagement with the cams, the latter are beveled inwardly, so that a shifting or lateral movement of the collar relatively to the levers causes the latter to slide up on one or the other of the cams and be reciprocated thereby. Another and important feature of the cams is the gradual increase in the surface which contacts with the lever, which is obtained by a gradual increase in the lateral dimensions of each cam toward its outer end, so that a shifting movement of the collar varies the length or period of the valve motion in relation to the engine-stroke. The arrangement of parts in the casing D' is similar to that in the casing D, so that by raising the steam-puppet in the casing D and the exhaust-puppet in the casing D' the supply-port $b^2$ and steam-port $b^4$ are connected coördinately with the bridging of the steam-port $b^5$ and exhaust-port $b^7$, and a corresponding connection of the alternate ports accompanies the raising of the other puppets.

In order to secure synchronism of movement between the respective valves of the two casings, so that steam is thus alternately admitted to one of the cylinder ends, each cam-collar is secured by any suitable means which allow proper adjustment to a common shaft K. As shown herein, the latter is parallel to the engine-cylinder and is rotatable in suitable bearings in the valve-casings and on the engine-frame, being conveniently driven from the engine-shaft by a pair of bevel-gears L L', though any suitable and operative arrangement of the shaft may be employed. In order to afford limited reciprocation of the shaft, an elongated hub $l$ is provided on the shaft-pinion, and a suitable spline M and groove M' hold the shaft and pinion in operative engagement, while permitting longitudinal movement of the shaft. A telescoping coupling or like device may be substituted, if desired. Reciprocation of the shaft is afforded by means of a rod O, extending from the engineer's station to a collar $o$, to which it is pivotally connected, the latter being revolubly mounted on a shaft between suitable adjustable stop-collars $o'$. It is evident that a longitudinal movement of the shaft will bring either one or the other of the sets of cams into engagement with corresponding lifting-levers of their respective casings. As these cams are set symmetrically, proper motion is given the valves. Furthermore, their positions on the periphery of the collars are such that one set of cams travels a portion of a revolution ahead of the other set, so that a reversal of the engine is obtained by shifting the cam-shaft to bring one or the other of the sets into action.

Complete control of the cut-off point is obtained, as the period of reciprocation of the lifting-levers may be varied at will of the operator. By so shifting the cam-shaft a greater or less portion of the cam-surface acts on the levers. This gives the requisite length or duration of the valve-stroke to admit steam during the whole of the engine-stroke or any required portion thereof.

One feature of the construction is the inclosure of the wearing-surfaces of the valve-gear, so that they can be perfectly lubricated, while all dirt and other extraneous matter is completely excluded.

By the arrangement of the apertured valve-seats transversely to the steam-passages the steam presses against the cylindrical shells of the valves equally from all directions, so as to balance or equalize itself, and, moreover, this pressure is transverse to the valve motion, so that each valve is as nearly balanced as may be. The narrow flanges alone present surfaces against which the steam may act, and these may be so proportioned as to insure the proper retention on the seat without excessive pressure.

When a valve is raised, it is to be noted that a portion of the live steam impinges on the cylindrical shell and passes over and through it, while another portion flows directly beneath the lower flange through the lower seat. The rush of the latter past the valve causes a diminution in pressure in the casing adjacent to the lower end of the valve, and a consequent expansion or movement of steam in the upper part of the casing above the valve tends to push the latter down upon its seat. As a consequence, while the direct pressure of the steam when the valve is seated does not load the lifting-lever excessively, the action of the steam when under motion positively seats the valve and does not allow it to become lodged when raised.

Obviously many details in the form and arrangement of the parts may be changed without departing from the spirit of the invention, and I do not limit myself to any particular design or construction except as set forth in the appended claims.

I claim as my invention—

1. A valve-gear for engines, comprising valve-casings adapted to bridge the supply, exhaust and steam ports of an engine-cylinder, puppet-valves adapted to control and direct the passage of steam through said casings, and valve-operating means adjustable to afford variable cut-off, said operating means being contained within the valve-casings.

2. A valve-gear for engines, comprising valve-casings adapted to bridge the supply, exhaust and steam ports of an engine-cylinder, puppet-valves adapted to control and direct the passage of steam through said casings, balanced under the combined pressure of the exhaust and live steam, and valve-operating means adjustable to afford variable cut-off, said operating means being contained within the valve-casings.

3. A valve-gear for engines, comprising valve-casings each adapted to bridge the corresponding supply, exhaust and steam ports of an engine-cylinder, puppet-valves in each casing adapted to control and direct the passage of steam therethrough, and mechanism adapted to operate said valves in synchronism, adjustable to reverse the order and vary the periods of oscillations of said valves, said mechanism being contained within the valve-casings.

4. A valve-gear for engines, comprising valve-casings adapted to bridge the supply, exhaust and steam ports of an engine-cylinder, puppet-valves adapted to control and direct the passage of steam through said casings, valve-operating means and means whereby said operating means within the casings may be adjusted at will to cut off at any point of the engine-stroke.

5. A valve-gear for engines, comprising valve-casings adapted to bridge the corresponding supply, exhaust and steam ports of an engine-cylinder, puppet-valves therein adapted to control and direct the passage of steam through the casings, positive lifting mechanism engaging said valves, and mechanism operating said lifting mechanism, shiftable across the face of said lifting mechanism to afford a variable period of motion to the latter, said lifting mechanism and operating mechanism being contained within said casings.

6. A valve-gear for engines, comprising valve-casings adapted to bridge the supply, exhaust and steam ports of an engine-cylinder, puppet-valves adapted to control and direct the passage of steam through said casings, puppet-lifting mechanism, and operating means for said mechanism movable relatively thereto to afford a variable cut-off, said puppet-lifting and said operating means being contained within said casings.

7. A valve-gear for engines, comprising dual, oppositely-disposed valve-casings, each bridging the corresponding supply, exhaust and supply ports of an engine-cylinder, puppet-valves in each of said casings adapted to control and direct the passage of steam therethrough, puppet-lifting mechanism in said casings, and operating mechanism within said casings adapted to engage and drive said lifting mechanisms in proper order, having adjustable connection therewith to reverse the order of operation and vary the periods of oscillation of said valves.

8. A valve-gear for engines, comprising valve-casings adapted to bridge the supply, exhaust and steam ports of an engine-cylinder, puppet-valves adapted to control and direct the passage of steam through said casings, valve-lifting mechanism within the casings, and operating mechanism adapted to be moved relatively to said lifting mechanism to afford variation in the point of the valve-stroke relatively to the engine-stroke.

9. A valve-gear for engines, comprising valve-casings adapted to bridge the supply, exhaust and steam ports of an engine-cylinder, puppet-valves adapted to control and direct the passage of steam through said casings, valve-lifting levers in said casings, and operating mechanism adapted to intermittently reciprocate said levers, movable relatively thereto to vary the period of oscillations of said levers.

10. A valve-gear for engines, comprising valve-casings adapted to bridge the supply, exhaust and steam ports of an engine-cylinder, puppet-valves adapted to control and direct the passage of steam through said casings, valve-lifting levers and cams in said casings, and operating-cams coacting with said lifting-cams to intermittently oscillate said levers, adjustably contacting with said lifting-cams to vary the period of the oscillations of said levers, and rotatably connected to the engine-shaft.

11. A valve-gear for engines, comprising valve-casings adapted to bridge the corresponding supply, exhaust and steam-ports of an engine-cylinder, puppet-valves adapted to control and direct the passage of steam through said casings and combined valve operating and reversing mechanism contained within the casings adjustable to vary the cut-off point.

12. A valve-gear for engines, comprising valve-casings adapted to bridge the corresponding supply, exhaust and steam ports of an engine-cylinder, puppet-valves adapted to control and direct the passage of steam through said casings, balanced under the combined action of the live and exhaust steam, and combined operating and reversing mechanism contained within the casings adjustable to vary the cut-off point.

13. A valve-gear for engines, comprising dual valve-casings adapted to bridge the corresponding supply, exhaust and steam ports of an engine-cylinder, puppet-valves in said casings controlling and directing the passage of steam therethrough, balanced under the combined action of the live and exhaust steam, positive lifting means in said casings, and mechanism adapted to operate said lifting means in synchronism, adjustable relatively thereto to reverse the order of operation and to vary the cut-off point.

14. A valve-gear for engines, comprising valve-casings adapted to bridge the corresponding supply, exhaust and steam ports of an engine-cylinder, puppet-valves therein adapted to control and direct the passage of steam through the casings, oscillatory lifting-levers within the casings engaging said valves, rotatable cams adapted to operatively engage said levers, adjustable in relation thereto to vary the period of oscillation, and means for rotating said cams.

15. A valve-gear for engines, comprising valve-casings adapted to bridge the corresponding supply, exhaust and steam ports of an engine-cylinder, puppet-valves therein adapted to control and direct the passage of steam through the casings, oscillatory lifting-levers within the casings engaging said valves, cams on said levers, rotatable cams adapted to coact with said lever-cams to intermittently reciprocate the levers, adjustable transversely to their planes of rotation to vary the periods of oscillation of said levers.

16. A valve-gear for engines, comprising valve-casings adapted to bridge the corresponding supply, exhaust and steam ports of an engine-cylinder, puppet-valves therein adapted to control and direct the passage of steam through the casing, oscillatory lifting-levers within the casings engaging said valves, and rotatable cams arranged in sets, one set being adapted to operate said valves in order reverse to that of the other set, and cam-rotating means adapted to throw either of said sets into operative position.

17. A valve-gear for engines, comprising valve-casings adapted to bridge the corresponding supply, exhaust and steam ports of an engine-cylinder, puppet-valves therein adapted to control and direct the passage of steam through the casings, oscillatory lifting-levers within the casings engaging said valves, rotatable cams arranged in sets, one set being adapted to operate said levers in order reverse to that of the other set, and cam-rotating means adapted to move said cams transversely to their plane of rotation to bring either of said sets into engagement with said levers.

18. A valve-gear for engines, comprising valve-casings adapted to bridge the corresponding supply, exhaust and steam ports of an engine-cylinder, puppet-valves therein adapted to control and direct the passage of steam through the casings, lifting-levers within the casings engaging said valves, rotatable cams adapted to operate said levers, shiftable across the faces of the levers to afford variable stroke thereto, and cam-operating means.

19. A valve-gear for engines, comprising valve-casings adapted to bridge the corresponding supply, exhaust and steam ports of an engine-cylinder, puppet-valves therein adapted to control and direct the passage of steam through said casings, lifting mechanism within the casings engaging said valves, a shaft having sliding and rotative engagement with said casings operatively connected to the engine-shaft, cams secured in sets on said shaft adapted to operate said lifting mechanism, and means to move said shaft longitudinally independently of its rotation to shift said cams relatively to said mechanism.

20. A valve-gear for engines, comprising valve-casings adapted to bridge the corresponding supply, exhaust and steam ports of an engine-cylinder, puppet-valves therein adapted to control and direct the passage of steam through said casings, lifting-levers engaging said valves, a shaft having sliding and rotative engagement on the engine-frame passing through said casings, a pinion having non-rotative sliding engagement with said shaft, a gear secured on the engine-shaft meshing with said pinion, a shifting-lever adapted to reciprocate said shaft, and cams secured on said shaft adapted to be thrown into engagement with said lifting-lever by the shifting of said shaft.

21. A valve-gear for engines, comprising valve-casings adapted to bridge the supply, exhaust and steam ports of an engine-cylinder, each provided with dual, apertured valve-seats in both the steam and exhaust passages, longitudinally-reciprocable, cylindrical valves adapted to simultaneously close on both seats, lifting mechanism to reciprocate said valves, and operating mechanism engaging said lifting mechanism, adjustably movable relatively thereto to vary the period of reciprocation of said valves.

22. A valve-gear for engines, comprising valve-casings adapted to bridge the supply, exhaust and steam ports of an engine-cylinder, each provided with dual, apertured valve-seats in both the steam and exhaust passages, axially-reciprocable, cylindrical valves adapted to close on said seats simultaneously, longitudinally apertured to afford passage for steam when raised from the seats, said casing-passages being disposed to conduct the steam entirely around the sealed valves, and means to operate said valves.

23. A valve-gear for engines, comprising valve-casings adapted to bridge the supply, exhaust and steam ports of an engine-cylinder, each provided with dual, apertured valve-seats in both the steam and exhaust passages, axially-reciprocable, cylindrical valves adapted to close on said seats simultaneously, longitudinally apertured to afford passage for steam when raised from the seats, said casing-passages being disposed to conduct the steam entirely around the sealed valves, lifting mechanism adapted to engage the valves and operating mechanism adapted to engage the lifting mechanism adjustably movable relatively thereto to reverse the engine and to afford variable cut-off.

24. A valve-gear for engines, comprising valve-casings adapted to bridge the supply, exhaust and steam ports of an engine-cylinder, a pair of apertured, alined valve-seats opening transversely from the supply-passage, a reciprocable valve adapted to close on said seats simultaneously, a pair of apertured, alined valve-seats opening into the exhaust-passage transversely thereto, a reciprocable valve adapted to close on said seats simultaneously, and means for operating said valves.

25. A valve-gear for engines, comprising valve-casings adapted to bridge the supply, exhaust and steam ports of an engine-cylinder, a pair of apertured, alined valve-seats opening transversely from the supply-passage, a reciprocable valve adapted to close on said seats simultaneously, a pair of apertured, alined valve-seats opening into the exhaust-passage transversely thereto, a reciprocable valve adapted to close on said seats simultaneously, means independently lifting said valves, and means adapted to alternately engage said lifting means, adjustably movable relatively thereto to reverse the order of engagement and to vary the period of reciprocation.

26. A valve-gear for engines, comprising valve-casings adapted to bridge the supply, exhaust and steam ports of an engine-cylinder, dual apertured valve-seats alined transversely to the supply-passages opening therefrom, a reciprocable valve adapted to close on said seats simultaneously, dual apertured valve-seats, alined transversely to the exhaust-passage opening therefrom, a reciprocable valve adapted to close on said exhaust-seats simultaneously, said valves being apertured to admit exhaust-steam on the outer ends of the valves when seated, to balance the back pressure on the inner ends, and means to operate said valves.

27. A valve-gear for engines, comprising valve-casings adapted to bridge the supply, exhaust and steam ports of an engine-cylinder, dual, apertured, alined valve-seats in both the steam and exhaust passages, a hollow cylindrical valve for each passage, flanged to close on said seats simultaneously, the passages being so disposed that the steam surrounds the shell and presses inwardly on the inner flange of the steam-valve when the latter is seated, and passes by and through the valves when the latter are raised, and means for operating said valves.

28. A valve-gear for engines, comprising oppositely-disposed valve-casings, each adapted to bridge the corresponding supply, exhaust and steam ports of an engine-cylinder, oppositely-disposed steam and exhaust puppets in each of said casings, oppositely-disposed levers in each casing, each operating one of said puppets, a pair of cams, one in each of said casings, adapted to coördinately engage said levers, a second pair of cams, one in each of said casings, adapted to coördinately engage said levers in reverse order to said first pair, and means to throw either pair into engagement.

29. A valve-gear for engines, comprising oppositely-disposed valve-casings, each adapted to bridge the corresponding supply, exhaust and steam ports of an engine-cylinder, oppositely-disposed steam and exhaust puppets in each of said casings, oppositely-disposed levers in each casing, each operating one of said puppets, a pair of cams, one in each of said casings, adapted to coördinately engage said levers, a second pair of cams, one in each of said casings, adapted to coördinately engage said levers in reverse order to said first pair, means to rotate said cams, and means to shift said cams across said levers.

30. A valve-gear for engines, comprising oppositely-disposed valve-casings, each adapted to bridge the corresponding supply, exhaust and steam ports of an engine-cylinder, dual, alined apertured valve-seats in both the steam and exhaust passages, valves for said seats, each centered by an axial stem reciprocable in the guide-apertures of the casings, levers pivoted in the casings, each engaging the valve-stems, and cams adapted to alternately engage said levers, operatively connected to the engine-shaft.

31. A valve-gear for engines, comprising oppositely-disposed valve-casings, each adapted to bridge the corresponding supply, exhaust and steam ports of an engine-cylinder, apertured valve-seats in both the steam and exhaust passages, valves for said seats, each centered by an axial stem reciprocable in the casings, levers pivoted in the casings, each engaging a valve-stem, a cam-collar in each casing, oppositely-disposed cams on each collar, the corresponding cams being adapted to coördinately engage the respective steam and exhaust valve levers in each casing, a shaft secured in the casings carrying said collars, means to shift said shaft to throw either set of cams into operative position, and means to rotate said shaft.

32. A valve-gear for engines, comprising valve-casings, puppet-valves adapted to control and direct the passage of steam through the casings, and valve-operating means within the casings adapted to afford variable cut-off.

33. A valve-gear for engines, comprising valve-casings, puppet-valves adapted to control and direct the passage of steam through the casings, and valve-operating means within the casings between the cylinder and valves adapted to afford variable cut-off.

34. A valve-gear for engines, comprising valve-casings, puppet-valves adapted to control and direct the passage of steam through the casings, lifting means within the casings engaging the valves, and operating means within the casings having variable engagement with the lifting means, and driving means connecting the operating means and engine-shaft.

35. A valve-gear for engines, comprising casings, steam-passages therein, inlet and outlet valves in a passage common to both, and operating means adapted to afford a variable point of cut-off, in said passage for valves.

36. A valve-gear for engines, comprising casings, steam-passages therein, inlet and outlet lifting-valves in a passage common to both, valve-lifting means in said passage, and operating means in the passage adapted to have an adjustably-variable period of engagement with said lifting means.

37. A valve-gear for engines, comprising casings, steam-passages therein, inlet and outlet lifting-valves in a passage common to both, vibratable lifting means in the passage and rotatable operating means in the passage engaging the lifting means.

38. A valve-gear for engines, comprising casings, steam-passages therein, inlet and outlet lifting-valves in a passage common to both, vibratable lifting means in the passage and rotatable operating means in the passage engaging the lifting means, reciprocatable transversely to the plane of rotation to vary the period of operative connection with the lifting means.

39. A valve-gear for engines, comprising valve-casings, provided with passages adapted to connect the supply and cylinder ports of an engine-cylinder, plural, multiseat-valves in the casing-passages, and operating and reversing mechanism in the casing-passages common to both the valves.

40. A valve-gear for engines, comprising valve-casings, provided with passages adapted to connect the supply and cylinder ports of an engine-cylinder, plural, multiseat-valves in the casing-passages, and operating and reversing mechanism in the casing-passages common to the valves, said mechanism being adjustable to vary the point of cut-off.

41. A valve-gear for engines, comprising valve-casings, steam-passages therein, a multiseat-inlet lifting-valve in the passage, a multiseat-outlet lifting-valve in the passage, vibratable lifting means in the casings and rotatable operating means in the casing engaging the lifting means, said rotatable means being axially reciprocable to vary the period of its engagement with the lifting means.

42. A valve-gear for engines, comprising steam-distributing casings, multiseat balanced inlet and outlet apertured lifting-valves in the casings, vibratable valve-lifting means in the casings, and rotatable operating means common to said lifting means, shiftable longitudinally to vary the period of engagement with the lifting means.

43. A valve-gear for engines, comprising steam-distributing casings, multiseat balanced inlet and outlet lifting-valves in a common steam-passage, vibratable valve-lifting means in the passage between the valves and the cylinder, and rotatable operating means in the casings engaging said lifting means, shiftable transversely to planes of oscillation of the lifting means to vary the period and order of operation of said lifting means.

44. A valve-gear for engines, comprising steam-distributing casings, multiseat balanced inlet and outlet lifting-valves in a common steam-passage, vibratable valve-lifting means in the passage between the valves and the cylinder, rotatable operating means in the casings engaging said lifting means, shiftable transversely to planes of oscillation of the lifting means to vary the periods and order of operation of said lifting means, and mechanism connecting said operating means and engine-shaft.

In testimony whereof I have hereunto signed my name in the presence of two subscribing witnesses.

GEORGE F. CONNER.

Witnesses:
OLIVER E. WHITESIDE,
A. A. WAGNER.